United States Patent [19]
Ladd et al.

[11] Patent Number: 4,966,760
[45] Date of Patent: Oct. 30, 1990

[54] METHOD FOR RECOVERING CHROMIUM FROM CHROMIUM-BEARING MATERIAL

[76] Inventors: Judith A. Ladd, 227 Pennsylvania Ave., Apt. #7, Sayre, Pa. 18840; Joseph E. Ritsko, 9 Foster Rd., Towanda, Pa. 18848

[21] Appl. No.: 403,078

[22] Filed: Sep. 5, 1989

Related U.S. Application Data

[63] Continuation of Ser. No. 236,882, Aug. 26, 1988, abandoned.

[51] Int. Cl.$^5$ ................... C01G 37/00; C22B 34/32
[52] U.S. Cl. .................................. 423/53; 423/55; 423/57; 423/140; 423/150; 75/101 R; 75/108; 75/119; 75/121; 75/2
[58] Field of Search ............ 423/53, 55, 57, 140, 423/150; 75/101 R, 108, 119, 121, 2

[56] References Cited

U.S. PATENT DOCUMENTS

| | | | |
|---|---|---|---|
| 3,784,672 | 1/1974 | Morgan et al. | 423/55 |
| 3,896,209 | 7/1975 | Fournier et al. | 423/55 |
| 4,157,942 | 6/1979 | Tuznik et al. | 423/55 |
| 4,305,754 | 12/1981 | Rappas et al. | 423/55 |
| 4,495,157 | 1/1985 | Sebenik et al. | 423/55 |
| 4,608,084 | 8/1986 | Scheithauer et al. | 75/101 R |
| 4,608,235 | 8/1986 | Vanderpool et al. | 423/53 |
| 4,666,685 | 5/1987 | Wiewiorowski | 423/55 |
| 4,668,483 | 5/1987 | Ladd et al. | 423/53 |
| 4,670,229 | 6/1987 | Wiewiorowski et al. | 423/55 |

*Primary Examiner*—Robert L. Stoll
*Assistant Examiner*—Paige C. Harvey

[57] ABSTRACT

A method for recovering chromium from chromium-bearing material which comprises heating the material which can contain any one or combination of Co, Ni, Fe, Mo, and W with solid alkali metal hydroxide in an oxidizing atmosphere at 600° C.–1000° C. to form a fused material containing water soluble compounds of Cr, Mo, and W contained therein. The fused material is cooled and contacted with water to form a leach solution and a residue. The leach solution is adjusted to a pH of from about 5–8 with sulfuric acid, and a water soluble calcium salt is added. The chromium-rich liquor is then adjusted to a pH of 1–3 with sulfuric acid. Sodium metabisulfite is added to the chromium-rich liquor to reduce the chromium to the trivalent state after which the pH is adjusted to 5–8 with a base to form a precipitate of essentially all of the chromium.

1 Claim, No Drawings

4,966,760

METHOD FOR RECOVERING CHROMIUM FROM CHROMIUM-BEARING MATERIAL

This is a continuation of copending application Ser. No. 07/236,882, filed on Aug. 26, 1988, now abandoned.

This invention relates to a method for separating chromium from superalloy scrap which can contain other elements as cobalt nickel, iron, molybdenum and tungsten and recovering the chromium therefrom by solubilizing it and the precipitating it in the trivalent state from solution.

BACKGROUND OF THE INVENTION

Chromium is a strategic metal in the United States because of the nearly 100% import dependence and wide variety of important uses. Among the most critical uses for chromium is providing high temperature and oxidation resistance in both cobalt and nickel-based superalloys. In order to be utilized in this application, the chromium must be of high purity. Other common uses for the metal, for example, in stainless steel have less stringent purity requirements.

Annually, many millions of pounds of superalloy material are removed from service and are downgraded as scrap. Much of the scrap superalloy is exported from the United States or used domestically for steel production. The value of the scrap is many times less than the value of the new alloy and in some cases is less than the value of the constituent metals. Therefore, this practice represents a larger dollar loss as well as a loss of strategic metals from the United States economy.

The recycle of superally materials, other than direct remelting has been economically unfeasible up to this time. In part, this has been due to the lack of technology for dissolution of large amounts of material at reasonable rates. In addition, since most of the chemistry for the production of chromium metal is based on chromite ore as a starting material, separation methods to remove elements found in used superalloys but which do not naturally occur in chromite have not been fully developed.

The following U.S. Patents relate to processing of chromium-bearing material:

U.S. Pat. No. 4,668,483 relates to recovery of chromium from material containing cobalt, molybdenum, and tungsten by roasting the material with an alkali metal compound to form reacted material containing alkali salts of chromium, molybdenum, and tungsten, water leaching the reacted material to form a solution of the salts and a solid containing the cobalt. The Cr-Mo-W solution is processed to recover Cr, Mo, and W by precipitation techniques. Chromium is precipitated upon addition of ammonium sulfate to the solution on the acid side.

U.S. Pat. No. 4,608,235 relates to a method for processing of stellite material emphasizing the recovery of cobalt therefrom. The material is fused with sodium hydroxide to form water soluble salts of chromium and tungsten and hydroxides of cobalt and nickel. The fused material is leached with water to solubilize the chromium and tungsten salts. The cobalt hydroxide remains as a solid.

U.S. Pat. No. 4,608,084 relates to digesting the chromium bearing material in hydrochloric acid to form a solution containing the major portion of the cobalt and chromium which is then further processed to precipitate cobalt as cobalt oxalate.

SUMMARY OF THE INVENTION

In accordance with one aspect of the invention, there is provided a method for recovering chromium from chromium-bearing material which comprises heating the material which can contain any one or combination of the elements of cobalt, nickel, iron, molybdenum and tungsten with a solid alkali metal hydroxide in an amount ranging from the stoichiometric amount required to convert chromium and any molybdenum and tungsten to their respective water soluble forms to about three times the weight of the material, in an oxidizing atmosphere at a temperature of from about 600° C. to about 1000° C. to form a fused material containing water soluble compounds of chromium and any molybdenum and tungsten contained in the material. The fused material is cooled and contacted with water to solubilize the water soluble salts and form a latch solution and a residue which are then separated. The leach solution is adjusted to a pH of from about 5 to 8 with sulfuric acid, and a sufficient amount of a water soluble calcium salt is added to it to form a precipitate of insoluble calcium salts of any molybdenum and tungsten present without precipitating significant amounts of chromium and a chromium-rich liquor which contains essentially all of the chromium. The insoluble calcium salts are separated from the chromium-rich liquor. The chromium-rich liquor is then adjusted to a pH of from about 1 to 3 with sulfuric acid. A sufficient amount of sodium metabisulfite is added to the chromium-rich liquor to reduce the chromium to the trivalent state after which the pH is adjusted to from about 5 to 8 with a base to form a precipitate of essentially all of the chromium and a spent liquor which are then separated.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention relates to a method for separation and recovery of chromium from chromium-bearing material which is most typically superalloy scrap.

As superally scrap, the material typically contains from about 5 to about 50% by weight chromium, from 0 to about 75% by weight cobalt, from 0 to about 75% by weight nickel, from 0 to about 30% by weight tungsten, and small amounts of elements such as iron, titanium, niobium, and others. The scrap consists typically of such items as blades, vanes, turnings, grindings, and the like of the size approximately $3'' \times 4'' \times \frac{1}{2}''$ or smaller.

The material is mixed with a solid alkali metal hydroxide, preferably sodium hydroxide. The amount of hydroxide can range from the stoichiometric amount equalling twice the number of moles of chromium plus tungsten and molybdenum to an amount greater than or equal to about three times the weight of the starting scrap material. Although the larger quantities of hydroxide render the melt more fluid and lead to a slight increase in the reaction rate, the cost of the hydroxide and the need to neutralize the excess favor the use of the stoichiometric amount. In practice the preferred amount of sodium hydroxide is the amount equal to the weight of the superalloy sample. For other alkali metal hydroxides, the preferred amount must be increased or decreased accordingly to the proportional difference in molecular weights between the alkali metal hydroxide and sodium hydroxide.

The mixture consisting of the superalloy material and the alkali metal hydroxide is then loaded into a reaction vessel constructed of sintered ceramic such as alumina or magnesia or an alloy such as INCO 600 or other high temperature oxidation resistant alloy which does not contain substantial percentages of either chromium, tungsten, or molybdenum. The vessel is then heated in an oxidizing atmosphere such as air, oxygen, or oxygen enriched atmosphere at a temperature of from about 600° C. to about 1000° C. and preferably from about 850° C. to about 925° C. until the solid pieces of material are judged to be reacted. The higher the temperature the faster the reaction rate. However, at temperatures in excess of 1000° C. the rate of evaporation of the molten sodium hydroxide becomes substantial. The completion of the reaction is determined by the dissolution of the solid chunks of material, by the formation of a non-magnetic precipitate, or by the allowable time for reaction, or by some other means.

When the reaction is judged completed, the mixture can be left to cool in the reaction vessel, or more preferably, the molten mass can be decanted onto a non-reactive metal surface such as a sheet of steel to cool rapidly.

The solid fused material is then broken into pieces and contacted with water to solubilize the water soluble salts and form a leach solution and a residue. The volume of water is sufficiently large to dissolve the excess alkali metal hydroxide and the soluble metal salts such as chromates, tungstates, and molybdates which have formed. In accordance with a preferred embodiment, about 25 liters of water are required per kilogram of chromium contained therein when sodium hydroxide is used in the preferred amount.

The residue is then separated from the leach solution by standard techniques such as by filtration. The residue contains essentially all of any cobalt and nickel and the major portion of the iron which were present in the starting material and these are in the form of their respective oxides. This residue can be processed by methods known in the art to recover the metals contained therein.

The leach solution is processed to recover the chromium as follows. The pH of the leach solution adjusted from the initial value which is about 13 to from about 5 to about 8 and preferably to from about 5.5 to about 7.0 and most preferably to about 6 to neutralize the excess alkali.

A sufficient amount of a water soluble calcium salt such as calcium chloride is then added to the resulting pH adjusted leach solution to form a precipitate of insoluble calcium salts of any molybdenum and tungsten as calcium molybdate and calcium tungstate and small amounts of calcium sulfate without precipitating significant amounts of chromium. Usually a time of from about 2 to about 4 hours is needed to allow for the complete precipitation, but at least about 0.5 hr. Very minor amounts of calcium chromate can precipitate. The amount of water soluble calcium salt is typically from about greater than 1 to 2.0 and preferably about 1.5 times the stoichiometric amount required to precipitate any molybdenum and tungsten. It is preferred to add the water soluble calcium salt in the form of a dilute solution. For example, when calcium chloride is the water soluble salt, the concentration of the dilute solution is typically from about 0.1 to about 10 g Ca/l. The resulting liquor contains essentially all of the chromium. The tungsten and molybdenum are reduced to about 0.5 g/l of each.

The insoluble calcium salts are then separated from the resulting chromium-rich liquor by standard techniques such as filtration.

The pH of the chromium-rich liquor is then adjusted to from about 1 to about 3 and preferably to about 2 with sulfuric acid.

A sufficient amount of solid sodium metabisulfite is added to the chromium rich liquor with agitation for preferably at least about 0.5 hours to reduce the chromium from the hexavalent state to the trivalent state. Preferably the amount of sodium metabisulfite is equal to from about greater than 1.0 to about 1.5 times and preferably about 1.15 times the stoichiometric amount required to accomplish the reduction. The completion of reduction is indicated by the color of the solution turning from orange to blue-green and by the absence of substantial amounts of hexavalent chromium which can be determined by known analytical methods or production control methods.

The pH of the resulting reduced chromium-rich liquor is then adjusted to from about 5 to about 8 and preferably to from about 6.0 to about 7.5 and most preferably about 7 with a base preferably sodium hydroxide to form a precipitate of essentially all of the chromium and a spent mother liquor. The chromium precipitate consists of mostly chromic hydroxide but amounts of basic chromic sulfate can be present. Care must be taken to choose a base which will not form a soluble complex with the chromium. For example, ammonium hydroxide should not be used because it complexes with chromium.

The chromium precipitate is then separated from the spent mother liquor by standard techniques such as filtration.

The chromium precipitate is washed preferably slurrying in water three times to remove any entrained sulfates. The chromic hydroxide so obtained is relatively pure.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for recovering chromium from chromium-bearing material, said method comprising:
    (a) heating said material containing one or more of the elements of cobalt, nickel, iron, molybdenum and tungsten with solid sodium hydroxide, with the amount of said sodium hydroxide ranging from the stoichiometric amount required to convert said chromium and any molybdenum and tungsten contained in said material to their respective water soluble forms to about three times the weight of said material, in an air atmosphere at a temperature of from about 850° C. to about 925° to form a fused material containing water soluble compounds of chromium, and any molybdenum and tungsten contained in said material;
    (b) cooling said fused material;
    (c) contacting said fused material with water to solubilize said water soluble salts and form a leach solution and a residue;

(d) separating said residue from said leach solution;
(e) adjusting the pH of said leach solution to from about 5.5 to about 7.0 with sulfuric acid;
(f) adding a sufficient amount of a water soluble calcium salt to the resulting pH adjusted leach solution to form a precipitate of insoluble calcium salts of any molybdenum and tungsten contained in said leach solution said amount being from about greater than one to about 1.5 times the stoichiometric amount required to reduce hexavalent chromium to the trivalent state, and a chromium-rich liquor containing essentially all of said chromium;
(g) separating said insoluble calcium salts from said chromium-rich liquor;
(h) adjusting the pH of said chromium-rich liquor to from about 1 to about 3 with sulfuric acid;
(i) adding a sufficient amount of sodium metabisulfite to the resulting pH adjusted chromium-rich liquor to reduce the chromium to the trivalent state;
(j) adjusting the pH of the resulting reduced chromium-rich liquor to from about 6.0 to about 7.5 with a base to form a precipitate of essentially all of said chromium and a spent mother liquor; and
(k) separating said precipitate of chromium from said spent mother liquor.

* * * * *